United States Patent [19]

Furukawa et al.

[11] 4,351,574
[45] Sep. 28, 1982

[54] LOAD-COMPENSATED TYPE GUIDE MECHANISM ADAPTED FOR A MACHINE

[75] Inventors: Yuji Furukawa, Tokyo; Makoto Sato, Kanagawa, both of Japan

[73] Assignee: Makino Milling Machine Co., Ltd., Tokyo, Japan

[21] Appl. No.: 169,216

[22] Filed: Jul. 15, 1980

[30] Foreign Application Priority Data

Mar. 6, 1980 [JP] Japan ................................ 55-27284

[51] Int. Cl.³ ........................ F16C 29/02; F16C 32/06
[52] U.S. Cl. ................................ 308/3 A; 308/5 R; 308/9
[58] Field of Search ................ 308/3 A, 5 R, 9, 160, 308/170, DIG. 1

[56] References Cited

U.S. PATENT DOCUMENTS

| | | | |
|---|---|---|---|
| 3,266,854 | 8/1966 | Aller | 308/5 R |
| 3,597,020 | 8/1971 | Thomas | 308/5 R |
| 3,597,021 | 8/1971 | Thomas | 308/5 R |
| 3,717,392 | 2/1973 | Ennis | 308/5R |
| 3,758,175 | 9/1973 | Van Roojen | 308/5 R |
| 4,193,644 | 3/1980 | Miyashita et al. | 308/9 |

FOREIGN PATENT DOCUMENTS

| | | | |
|---|---|---|---|
| 1027395 | 4/1966 | United Kingdom | 308/9 |
| 516504 | 6/1976 | U.S.S.R. | 308/9 |
| 568531 | 8/1977 | U.S.S.R. | 308/3 A |
| 606710 | 5/1978 | U.S.S.R. | 308/5 R |

*Primary Examiner*—Richard R. Stearns
*Attorney, Agent, or Firm*—McAulay, Fields, Fisher, Goldstein & Nixxen

[57] ABSTRACT

A load-compensated type guide mechanism, adapted for a machine incorporating a movable machine part and a stationary base having a guide surface on which the movable machine part slides, is provided with a pressurized fluid supply source from which a pressurized fluid is supplied between the slide surface of the movable machine part and the guide surface of the base. The static pressure of the pressurized fluid is adjusted by pressure control means so that the static pressure for supporting the movable machine part is smaller than the entire perpendicular load of the machine part acting on the guide surface. The static pressure of the pressurized fluid is changed in response to a change in a perpendicular displacement of the machine part with respect to the guide surface. The change in the perpendicular displacement is detected by detecting means.

12 Claims, 9 Drawing Figures

LOAD-COMPENSATED TYPE GUIDE MECHANISM ADAPTED FOR A MACHINE

FIELD OF THE INVENTION

The present invention relates to a load-compensated type guide mechanism adapted for a machine, such as a machine tool or a dimension measuring instrument, which incorporates therein a movable machine part and a stationary base having a guide surface on which the movable machine part slides.

BACKGROUND OF THE INVENTION

In a machine tool or a dimension measuring instrument, a movable machine part, such as a work table, slides on a guide surface of a stationary base. The sliding movement of the movable machine part is driven by a drive source, such as a motor. In order to acquire a smooth sliding movement of the movable machine part on the guide surface of the stationary base, two conventional guide mechanisms have been employed. One of the conventional guide mechanisms is well known as a dynamic pressure type guide mechanism, in which the movable machine part slides on the guide surface of the base while directly contacting the guide surface via a film of a lubricant, such as a lubricating oil. The other of the conventional guide mechanisms is a static pressure type guide mechanism disclosed in, for example, U.S. Pat. No. 3,711,167, in which mechanism a pressurized fluid is supplied between the slide surface of the movable machine part and the guide surface of the base so that the static pressure of the pressurized fluid supports the entire load of the movable machine part. In that arrangement, no direct contact of the slide surface of the movable machine part with the guide surface of the base occurs. However, with the dynamic pressure type guide mechanism, the sliding movement of the movable machine part usually is subject to a rather large frictional force which increases in response to an increase in the load applied to the movable machine part. Further, since a so-called "stick slip" motion occurs during the sliding movement of the movable machine part the, accuracy of the sliding movement is low.

With the static pressure type guide mechanism, collection of the pressurized fluid is difficult if the pressurized fluid is a pressurized liquid. Further, if a pressurized liquid is employed, unfavorable an generation of heat occurs during the sliding movement of the movable machine part on the guide surface of the base, due to the viscosity of the liquid. On the other hand, if the pressurized fluid is a pressurized gas, such as pressurized air, a steady sliding movement of the movable machine part is not acquired. In addition, not only the pressurized liquid, but also the pressurized gas, ineffectively damp the vibration of the movable machine part.

In order to obviate the above-mentioned defects encountered by the conventional dynamic pressure and static pressure type guide mechanisms, a load-compensated type guide mechanism has been developed, and one example thereof is disclosed in Japanese Laid-open Patent Application No. 1979-126850 by the same applicant as the present application. However, the applicant has invented a novel load-compensated type guide mechanism which has an improved performance over that disclosed in the above-mentioned application.

OBJECTS AND SUMMARY OF THE INVENTION

An object of the present invention is to provide a novel load-compensated type guide mechanism adatped for incorporation in a machine, which includes a base having a guide surface, and a movable machine part driven so as to slide on the guide surface.

Another object of the present invention is to provide a novel fluid pressure control means adapted for use as a fluid pressure control element in the above-mentioned load-compensated type guide mechanism.

In accordance with the present invention, there is provided a load-compensated type guide mechanism adapted for incorporation in a machine which includes a stationary base having a guide surface, a movable machine part having a slide surface disposed so as to face the guide surface, and a drive means for slidably driving the movable machine part on the guide surface, comprising, in combination:

a fluid supply source for supplying a pressurized fluid;

fluid conduit means disposed between said fluid supply source and said machine for introducing said pressurized fluid from said fluid supply source between said guide surface and said slide surface thereby to produce a pressure force for lifting said movable machine part above said guide surface of said stationary base;

at least one means for detecting the change in a perpendicular displacement of said movable machine part with respect to said stationary base when a perpendicular load acts from said slide surface of said movable machine part toward said guide surface of said stationary base, and;

at least one pressure control means disposed in said fluid conduit means, said pressure control means comprising a first means for establishing a preadjusted pressure level of said pressurized fluid so that said pressure force for lifting said movable machine part is smaller than said perpendicular load, and a second means for controlling said first means so that said preadjusted pressure level of said pressurized fluid changes in response to the change in said perpendicular displacement of said movable machine part, whereby a frictional force acting between said slide surface of said movable machine part and said guide surface of said stationary base is maintained at a constant level irrespective of the change in said perpendicular load.

Further objects, features and advantages of the present invention will be made apparent from the following description of preferred embodiments when taken together with the accompanying drawings, wherein.

DESCRIPTION OF THE PREFERRED EMBODIMENTS

Figure 1:
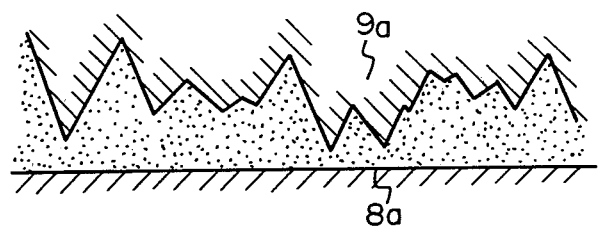
FIGS. 1a through 1e are enlarged part 14 diagrammatic views of the contacting surfaces of a guide surface of a machine base and of a movable machine part sliding on the guide surface, according to conventional guide mechanisms and the present invention.
Figure 1:
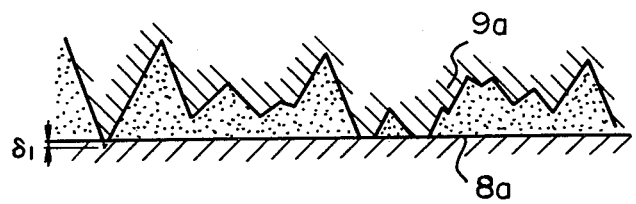
Figure 1:
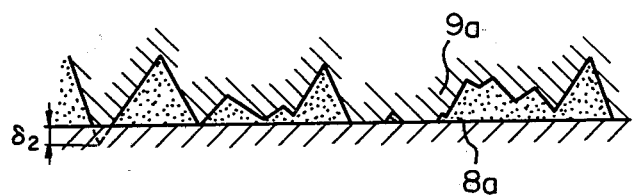
Figure 1:
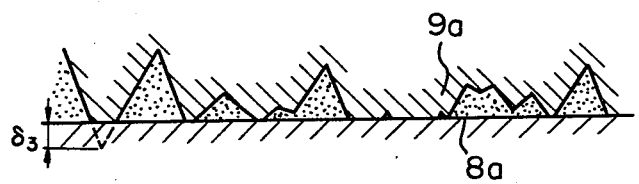
Figure 1:
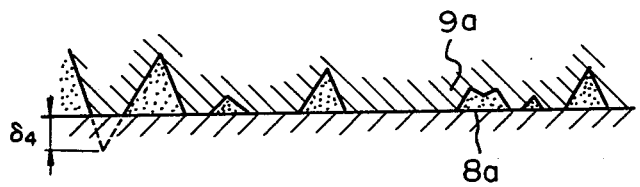

Referring to FIGS. 1A through 1E, various contacting states of a movable machine part 9a and a guide surface 8a on which the movable machine part 9a slides are illustrated in an enlarged scale, respectively. Generally, in machines, either the contact surface of the movable machine part 9a or the guide surface 8a becomes the surface to which known quenching and grinding forces are applied, and the other becomes the surface to which a known scraping force is applied. Throughout FIGS. 1a through 1e, the contact surface of the movable machine part 9a becomes the above-mentioned scraped surface, while the contact surface of the guide surface 8a becomes the above-mentioned quenched and ground surface. Therefore, the contact surface of the movable machine part 9a has many projections. On the other hand, the contact surface of the guide surface 8a is hard and flat. However, while the movable machine part 9a repeatedly slides on the guide surface 8a, the projections of the contact surface of the movable machine part 9a are pressed against the hard contact surface of the guide surface 8a under the effect of both the weight of the movable machine part per se and a load applied to the movable machine part 9a. As a result, the projections are gradually and elastically deformed into flat headed projections. In the conventional dynamic pressure type guide mechanism shown in FIG. 1e, during the sliding movement of the movable machine part 9a, the weight of the machine part 9a and entire load applied to the machine part 9a are directly supported by the projections of the contact surface of the movable machine part 9a. In the conventional static pressure type guide mechanism shown in FIG. 1a, a pressurized fluid intervenes between the contact surface of the movable machine part 9a and the contact surface of the guide surface 8a, so that the movable machine part 9a is lifted above the contact surface of the guide surface 8a by the static pressure of the pressurized fluid. That is, there is no direct contact between the contact surface of the movable machine part 9a and that of the guide surface 8a. In the load-compensated type guide mechanism according to the present invention shown in FIGS. 1b through 1d, a pressurized fluid introduced between the contact surface of the movable part 9a and that of the guide surface 8a is used, so that the static pressure of the pressurized fluid applies, to the machine part 9a, a lifting force which is smaller than the addition of the weight of the machine part 9a and the load acting on the machine part 9a in the direction perpendicular to the contact surface of the guide surface 8a. Therefore, during sliding movement of movable machine part 9a, there is a partial direct contact between the contact surface of the movable machine part 9a and that of the guide surface 8a. As a result, the above-mentioned addition of the weight of the machine part 9a and the perpendicular load acting on the machine part 9a is supported by both the pressurized fluid and the guide surface 8a. FIG. 1b illustrates the case where the static pressure of the pressurized fluid is rather large, and the supporting force applied to the movable machine part 9a from the guide surface 8a is rather small. Therefore, the amount of elastic deformation δ1 of the projections of the contact surface of the machine part 9a is small. FIGS. 1c and 1d illustrate two cases where the static pressure of the pressurized fluid is rather small, and the supporting force of the guide surface 8a is rather large. Therefore, in the cases of FIGS. 1c and 1d, the amounts of elastic deformations δ2 and δ3 of the projections of the contact surface of the movable machine part 9a are relatively large. It should be noted that in the case of the dynamic pressure type guide mechanism shown in FIG. 1e, the amount of elastic deformation δ4 of the projections of the contact surface of the movable machine part 9a is much larger than with the load-compensated type guide mechanism shown in FIGS. 1b through 1d.

The load-compensated type guide mechanism according to an embodiment of the present invention will be described hereinbelow with reference to FIG. 2.

Figure 2:
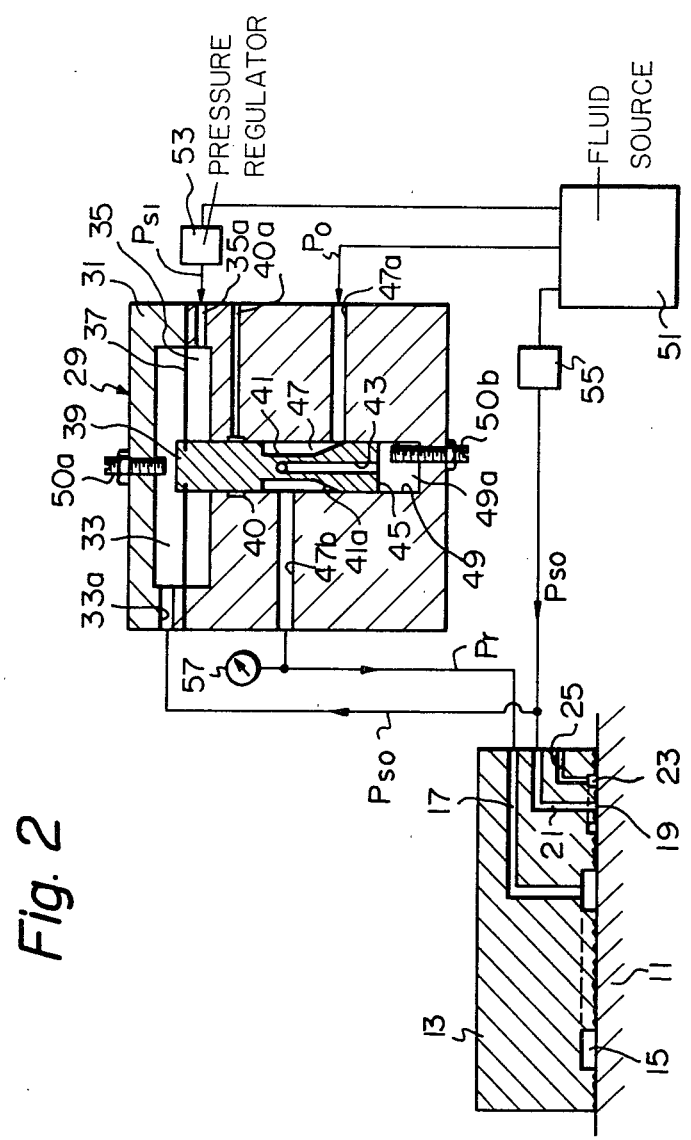
FIG. 2 is a schematic, partly cross-sectional view, of a load-compensated type guide mechanism adapted for incorporation into a machine, according to one embodiment of the present invention.

In FIG. 2, a movable machine part 13 is mounted on a guide surface of a base 11 of a machine, so as to slide on the guide surface. The movable machine part 13 is provided with a sliding surface in which a fluid flow port 15 and a fluid supply passage 17 are formed, so that a pressurized fluid streams through the passage 17 and the port 15 against the guide surface of the base 11. The sliding surface of the movable machine part 13 is also formed with a fluid flow opening 19, a fluid supply passage 21 interconnected with the fluid flow opening 19, a fluid escape opening 23, and a passage 25 having one end connected to the fluid escape opening 23 and the other end connected to the atmosphere. The fluid flow opening 19 and the fluid supply passage 21 are provided for detecting a small perpendicular displacement of the movable machine part 13 from the guide surface of the base 11 through detection of a change in the back pressure of the pressurized fluid. That is, a pressurized fluid having a preadjusted pressure is supplied from the outside, and the pressurized fluid streams through the passage 21 and the opening 19 against the guide surface of the base 11. The fluid escape opening 23 is arranged so as to surround the opening 19. Therefore, the pressurized fluid streaming from the opening 19 escapes through the fluid escape opening 23 and the passage 25 into the atmosphere. The above-mentioned fluid flow port 15 is supplied with a pressurized fluid from a pressurized fluid source 51 through a pressure controller 29 and the fluid supply passage 17. The pressure controller 29 amplifies the pressure of the pressurized fluid. The amplified pressure of the pressurized fluid is indicated by a pressure indicator 57. The pressurized fluid source 51 also supplies a pressurized fluid to the fluid flow opening 19 via a pressure regulator 55 and the fluid supply passage 21. The pressurre of the pressurized fluid supplied to the opening 19 is adjusted to a predetermined pressure value $P_{S0}$ by the regulation of the pressure regulator 55. The pressure controller 29 has a housing 31 in which two fluid chambers 33 and 35 isolated from one another by a diaphragm 37 are formed. The chamber 33 has an aperture 33a, and the chamber 35 has an aperture 35a. In the housing 31, a valve spool 39 having an upper end fixed to the diaphragm 37 is incorporated so that the valve spool 39 is capable of axially sliding in a valve bore 49 having a bottom in response to the displacement of the diaphragm 37. Beneath a lower free end 45 of the valve spool 39, a fluid chamber 49a is defined by the side wall of the valve bore 49 and the bottom of the bore 49. The valve spool 39 is formed at a middle portion thereof with a constriction 41 having a small diameter. Thus, a fluid chamber 47 is formed between the constriction 41 of the valve spool 39 and the side wall of the valve bore 49. The fluid chamber 47 is interconnected with the fluid chamber 49a, via a fluid passage 43 formed in the valve spool 39. The housing 31 is further formed with a fluid inlet passage 47a and a fluid outlet passage 47b, both connected to the valve bore 49. The pressurized fluid having the predetermined pressure value $P_o$ and supplied by pressurized fluid source 51 flows into chamber 47 through fluid inlet passage 47a. At this stage, it should be noted that the entrance of fluid inlet passage 47a opening toward the valve bore 49 is arranged so as to be closed or opened by valve spool 39. That is, the opening area of the above-mentioned entrance of the fluid inlet passage 47a is changed in response to the sliding movement of the valve spool 39. Therefore, the pressurized fluid flowing into the valve bore 49 through the fluid inlet passage 47a undergoes a so-called throttling effect caused by the sliding movement of the valve spool 39. The pressurized fluid flowing in the valve bore 49 is in turn sent to the movable machine part 13 via the fluid chamber 47, the fluid passage 47b and a fluid conduit interconnecting the pressure controller 29 and the machine part 13. The valve spool 39 is formed with a tapered valve land 41a adjacent to the constriction 41. The tapered valve land 41a is effective for gradually changing the opening area of the entrance of the fluid inlet passage 47a. That is, a sudden change in the opening area of the entrance of the fluid passage 47a can be avoided. Alternately, if necessary, the tapered valve land 41a of the valve spool 39 may be replaced with a step-like valve land, which is effective for causing a sudden change in the opening area of the entrance of the fluid inlet passage 47a in response to the sliding movement of the valve spool 39. The diaphragm 37 separating the fluid chambers 33 and 35 is preferably made of a rubber film having a rather small elasticity constant. The sliding movement of the valve spool 39 is limited by stops 50a and 50b which are disposed adjacent to both ends of the valve spool 39. Therefore, the displacement of the diaphragm 37 is also limited to a predetermined extent and, as a result, the diaphragm 37 is protected from breakage. In the embodiment of FIG. 2, the stops 50a and 50b consist of screws adjustably threaded in the housing 31 at positions of the housing 31 adjacent to both ends of the valve spool 39. The housing 31 is formed with an annular groove 40 and a passage 40a, the inner end of which is connected to the annular groove 40 and the outer end of which communicates with the atmosphere. The annular groove 40 and the passage 40a are positioned between the fluid chamber 35 which is filled with pressurized fluid at pressure level $P_{S1}$ and the fluid chamber 47 which is filled with pressurized fluid at pressure level $P_r$. Therefore, either pressurized fluid leaking from the chambers 35 and 47 into the slide contact portion of the valve spool 39 and the side wall of the valve bore 49 can positively flow toward the atmosphere via the groove 40 and the passage 40a. As a result, accurate and smooth sliding movement of the valve spool 39 in the valve bore 49 is guaranteed.

With the above-mentioned pressure controller 29, the fluid chamber 35 is supplied with pressurized fluid at pressure level $P_{S1}$ via a fluid conduit, a pressure regulator 53 and the aperture 35a. The fluid chamber 47 is supplied from the pressurized fluid source 51 with pressurized fluid at pressure level $P_o$ via a fluid conduit and the fluid inlet passage 47a. The pressurized fluid supplied into the fluid chamber 47 is subjected to the throttling action of valve spool 39. Consequently, the pressure level of the pressurized fluid is changed from $P_o$ to $P_r$. The pressurized fluid in the chamber 47 is in turn sent to the fluid flow port 15 of the movable machine part 13, via the fluid outlet passage 47b, a pressure indicator 57, a fluid conduit, and the fluid supply passage 17. The pressurized fluid in the fluid chamber 47 is also supplied into the fluid chamber 49a through the fluid passage 43 of the valve spool 39. The pressurized fluid source 51 also supplies the pressurized fluid at pressure level $P_{S0}$ toward the fluid flow opening 19, via the pressure regulator 55, a fluid conduit, and the fluid supply passage 21. Pressurized fluid at pressure level $P_{S0}$ is also supplied into the fluid chamber 33, via a fluid conduit, which branches from the fluid conduit interconnecting between the pressurized fluid source 51 and the fluid supply passage 21, and the aperture 33a.

The operation of the load-compensated type guide mechanism of the embodiment shown in FIG. 2 will be described hereinbelow.

It is initially determined what percent of the weight $W$ of the movable machine part 13 should be supported by the static pressure of the pressurized fluid supplied between the slide surface of the movable machine part 13 and the guide surface of the base 11. Assuming that fifty percent of the weight $W$ of the movable machine part 13 is supported by the static pressure of the pressurized fluid, another fifty percent of the weight $W$ of the movable machine part 13 will be directly supported by the guide surface of the base 11. Then, the actual pressure value $P_r$ of the pressurized fluid is determined by calculation, so that the product of the effective pressure receiving area adjacent to the fluid flow port 15 and the actual pressure value $P_r$ is equal to a half of the weight $W$ of the movable machine part 13. Subsequently, after the determination of the actual pressure value $P_r$ by calculation, manual adjustment of the pressure regulators 53 and 55 is effected so that the position of the valve spool 39 in the valve bore 49 is adjusted and the pressure indicator 57 indicates the pressure value $P_r$. Upon completion of the manual adjustment of the pressure regulators 53 and 55, the following relation (1) is established.

$$P_{S0} \cdot A_1 = P_{S1} \cdot A_2 + P_r \cdot A_3 \tag{1}$$

where $A_1$ is the effective area of the diaphragm 37 on the side of the fluid chamber 33, $A_2$ is the effective area of the diaphragm 37 on the side of the fluid chamber 35 ($A_2$ is smaller than $A_1$ by the amount of the cross-sectional area of the valve spool 39), and $A_3$ is the effective area of the free end of the valve spool 39. The equation (1), above does not include the elastic force of diaphragm 37, since the elasticity constant of the diaphragm is very small and can be ignored.

Figure 3:
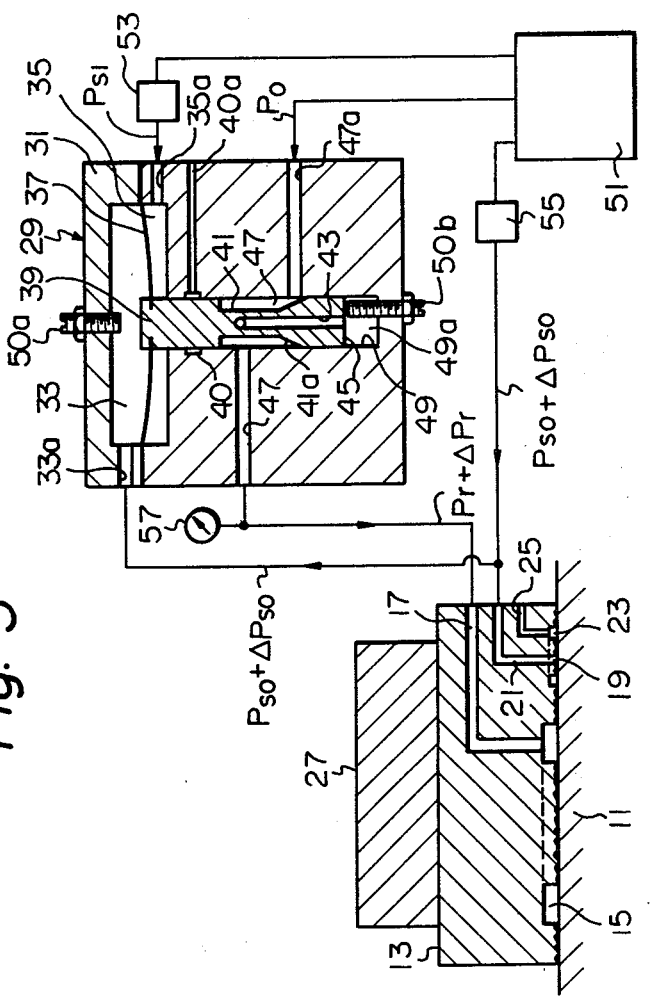
FIG. 3 is a schematic view of the guide mechanism of FIG. 2, similar to FIG. 2 but which illustrates a state where a load is applied to the movable machine part.

Assuming now that an additional load 27 (the weight is $\Delta W$) is applied to the movable machine part 13 as shown in FIG. 3, the additional load 27 will cause a change in the perpendicular displacement of the movable machine part 13 with respect to the guide surface of the base 11 caused by the elastic deformation of the projections of the slide surface of the movable machine part 13. As a result, the back pressure of the pressurized fluid which is supplied to the fluid flow opening 19 changes from $P_{S0}$ to $P_{S0} + \Delta P_{S0}$. Therefore, the pressure value of the pressurized fluid filling the fluid chamber 33 will increase so as to become $P_{S0} + \Delta P_{S0}$. Consequently, as shown in FIG. 3, the displacement of the diaphragm 37 toward the fluid chamber 35 occurs while causing the downward sliding movement of the valve spool 39. Thus, the opening area of the entrance of the fluid inlet passage 47a is in turn increased. Accordingly, the pressure level of the pressurized fluid introduced into the fluid chamber 47 increases until the pressure level changes from $P_r$ to $P_r + \Delta P_r$. As a result, the fluid flow port 15 of the movable machine part 13 is supplied with the pressurized fluid at pressure of $P_r + \Delta P_r$. Consequently, the following relation (2) is established with the pressure controller 29.

$$(P_{S0} + \Delta P_{S0}) \cdot A_1 = P_{S1} \cdot A_2 + (P_r + \Delta P_r) \cdot A_3 \quad (2)$$

From equations (1) and (2), above, the following equation (3) is desired:

$$\Delta P_r = (A_1/A_3) \cdot \Delta P_{S0} \quad (3)$$

From the equation (3), it will be understood that the pressure controller 29 is able to produce the amplified pressure $\Delta P_r$ which is $(A_1/A_3)$ times the small change $\Delta P_{S0}$ in the back pressure. The amplified pressure $\Delta P_r$ is sufficient for supporting the additional load $\Delta W$. That is to say, when an additional load $\Delta W$ is added to the weight W of the movable machine part 13, the pressure controller 29 produces an increase $\Delta P_r$ in the static pressure of the pressurized fluid, so that compensation for the additional load is achieved. As a result, the direct support of the weight of the movable machine part 13 by the guide surface of the base 11 can be maintained at the level of half of the weight W of the movable machine part 13. In other words, the pressure controller 29 operates so that the direct support of the movable machine part 13 by the guide surface of the base 11 is always maintained at a constant level, irrespective of any change in the load applied to the movable machine part 13. Accordingly, the frictional force acting between the slide surface of the movable machine part 13 and the guide surface of the base 11 is always kept constant. It should be noted that the amplification rate $(A_1/A_3)$ of the pressure controller 29 is determined by the effective area $A_1$ of the diaphragm 37 and the effective area $A_3$ of the free end of the valve spool 39. Therefore, the determination of any amplification rate of the pressure controller 29 can be achieved by appropriately determining the effective area of the diaphragm 37 and the effective area of the lower free end of the valve spool 39 at the determined stage of the pressure controller 29. Accordingly, the design of the pressure controller 29 is rather simple.

Figure 4:
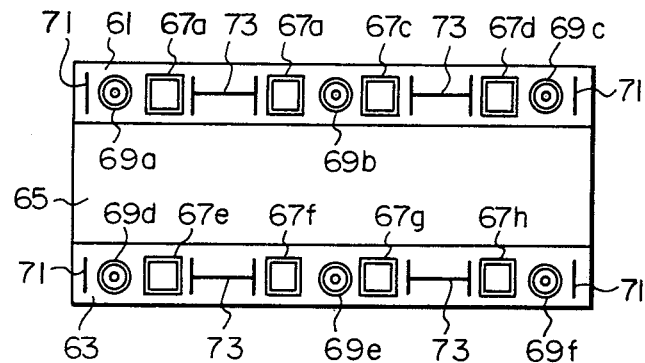
FIG. 4 is a plan view of a sliding surface of a saddle of a machining center to which the load-compensated type guide mechanism of the present invention is applied for stably sliding a work table of the machining center on the sliding surface of the saddle.

FIG. 4 illustrates a case where the load-compensated type guide mechanism applies to a machining center having a saddle having a guide surface on which a work table is slidably mounted. In FIG. 4, 61 and 63 designate a pair of scraped guide surfaces of the saddle. 65 designates a lowered portion formed between the pair of scraped guide surfaces 61 and 63. The work table (not shown) slides on the guide surfaces 61 and 63 of the saddle in, for example, the X-direction. The scraped guide surfaces 61 and 63 are formed with eight fluid flow ports 67a through 67h through which flow a pressurized fluid for supporting the weight of the work table along with the load applied to the work table also provided are fluid flow openings and fluid escape openings 69a through 69f. The fluid flow openings are used for flowing a pressurized fluid for detecting a change in the perpendicular displacement of the work table with respect to the guide surfaces 61 and 63. 71 and 73 designate oil grooves for supplying a lubricating oil between the slide surface of the work table and the guide surfaces 61 and 63. The arrangement of the fluid flow ports, the fluid flow openings, the fluid escape openings and the oil grooves are appropriately chosen so that a constant and low friction slide of the work table on the saddle is reliably achieved. Naturally, the slide surface of the work table facing the scraped guide surfaces 61 and 63 is formed as a hardened and ground flat surface. Further, in the case of the load-compensated guide mechanism applied to the guide surfaces 61 and 63 of the saddle shown in FIG. 4, six pressure controllers 29 (FIGS. 2 and 3) are employed in six combinations of the fluid flow ports, fluid flow openings and fluid escape openings, as follows: 67a and 69a, 67b, 67c and 69b, 67d and 69c, 67e and 69d, 67f, 67g and 69e, and 67h and 69f.

One experiment conducted by the inventors for illustrating the advantageous effect of the present invention will be described hereinbelow.

Figure 5:
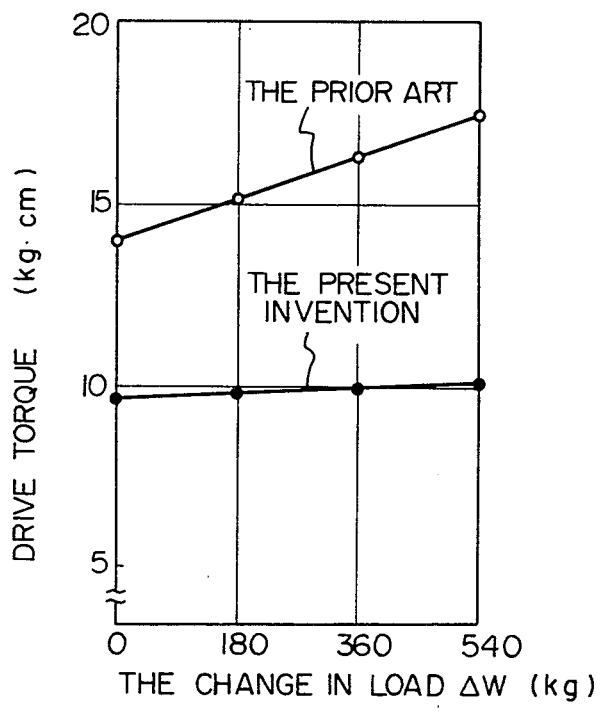
FIG. 5 is a diagram for illustrating one advantage of the present invention over the prior art.

In this experiment, a work table having a weight of 520 kilograms and a saddle having a guide surface on which the work table slides are employed. Initially, the static pressure of the pressurized fluid was selected so as to support half of the weight of the work table, that is, 260 kilograms. The pressurized fluid supplied from the pressurized fluid source 51 (FIGS. 2 and 3) to the pressure controller 29 (FIGS. 2 and 3) was air at a pressure of 5 kg/cm$^2$. During the experiment, a change in the frictional force acting between the slide surface of the work table and the guide surface of the saddle was measured when the load applied to the work table was changed. The measurement of the change in the frictional force was carried out in two cases, one where the load-compensated type guide mechanism of the present invention was employed, and the other where no load-compensated type guide mechanism was employed. FIG. 5, in which the abscissa shows the change in the load and the ordinate shows a change in drive torque for sliding the work table, illustrates the result of the measurement. From FIG. 5, it is clearly apparent that when the load-compensated type guide mechanism was employed, the drive force corresponding to the frictional force is kept almost constant even if the load applied to the work table changes. Therefore, the sliding movement of the work table can be accurate and steady.

Further advantages of the present invention are as follows.

(1) If a plurality of the pressure controllers 29 (FIGS. 2 and 3) are employed and if a plurality of fluid flow ports are distributed in the entire guide surface of a stationary base or in the entire slide surface of a movable machine part, the movable machine part is able to perform a very steady sliding movement, even if a load is applied to a position of the work table distant from the center of the work table.

(2) Since air can be used as a pressurized fluid, collection of the pressurized fluid is not needed.

What is claimed is:

1. A load-compensated type guide mechanism of a machine, comprising:
   a stationary base incorporated in said machine;
   a guide surface formed in said stationary base;
   a movable machine part having a slide surface contacting said guide surface of said stationary base;

a fluid supply source for generating a pressurized fluid to be supplied between said guide surface and said slide surface;

fluid conduit means disposed between said fluid supply source and said machine for introducing said pressurized fluid from said fluid supply source between said guide surface and said slide surface thereby to produce a pressure force for lifting said movable machine part above said guide surface of said stationary base;

a pressure regulating means for establishing a preadjusted pressure level of said pressurized fluid such that said pressure force for lifting said movable machine part is smaller than a premeasured perpendicular load acting from said slide surface of said movable machine part toward said guide surface of said stationary base;

means for detecting a change in the amount of perpendicular elastic deformation of projections formed in at least one of said slide surface and said guide surface when said perpendicular load acting from said slide surface toward said guide surface changes; and pressure control means for automatically controlling said preadjusted pressure level of said pressurized fluid in response to the change in said perpendicular elastic deformation so that a frictional force acting between said slide surface of said movable machine part and said guide surface of said stationary base is maintained at a constant level regardless of change in said perpendicular load.

2. A load-compensated type guide mechanism according to claim 1, wherein said detecting means comprises a back pressure detecting means comprising at least one fluid flow port formed in one of said slide surface and said guide surface, a conduit means disposed between said pressurized fluid supply source and said fluid flow port for introducing a pressurized fluid having a predetermined first pressure level toward said fluid flow port, at least one fluid escape passage means formed in one of said guide slide surface and said guide surface, said fluid escape passage means being arranged adjacent to said fluid flow port and interconnected with the atmosphere, and a back pressure detecting circuit means fluidly connected to said fluid flow port.

3. A load-compensated type guide mechanism according to claim 2, wherein a plurality of said back pressure detecting means is provided, each comprising a fluid flow port formed in common with one of said slide surface of said movable machine part and said guide surface of said stationary base, and a corresponding number of said pressure control means.

4. A load-compensated type guide mechanism according to claim 1 or 2, further comprising pressure regulating valve means arranged in said fluid conduit means disposed between said fluid supply source and said movable machine part, said pressure regulating valve means adjustably regulating the pressure of said pressurized fluid from said fluid supply source.

5. A load-compensated type guide mechanism according to claim 1, 2 or 3, wherein said fluid supply source comprises a pressurized air supply source.

6. A load-compensated type guide mechanism according to claim 1, 2 or 3, wherein one of said slide surface of said movable machine part and said guide surface of said stationary base is provided with oil grooves for supplying a lubricating oil to said slide surface and said guide surface.

7. A load-compensated type guide mechanism according to claim 1, wherein said pressure control means comprises:

a housing means having a first fluid chamber connected to said back pressure detecting circuit means of said back pressure detecting means and filled with a part of said pressurized fluid to be supplied to said fluid flow port of said back pressure detecting means, a second fluid chamber filled with a pressurized fluid having a predetermined second pressure level, which is supplied from said pressurized fluid supply source, a valve bore having a bottom, a fluid inlet passage connected to said valve bore, and a fluid outlet passage connected to said valve bore;

a diaphragm disposed within said housing means and isolating said first fluid chamber from said second fluid chamber, said diaphragm having a predetermined spring constant; and a valve spool movably fitted within said valve bore, said valve spool having one end thereof fixed to said diaphragm so that said valve spool moves with said diaphragm, the opposite free end defining a third fluid chamber disposed adjacent to the bottom of said valve bore, a constriction defining a fourth fluid chamber within said valve bore, said fourth chamber being fluidly connected to said fluid inlet and outlet passages, and a fluid passage connecting said third and fourth fluid chambers, said valve spool cooperating with said valve bore so as to act as said pressure regulating means of said pressure control means.

8. A load-compensated type guide mechanism according to claim 7, wherein said valve spool is formed with a valve land disposed adjacent to said constriction, said valve land closing and opening said fluid inlet passage in response to the movement of said valve spool.

9. A load-compensated type guide mechanism according to claim 2, 3, 7 or 8, wherein said diaphragm of said pressure control means is made of a rubber material.

10. A load-compensated type guide mechanism according to claim 7 or 8, wherein said housing means of said pressure control means is formed with an air passage connecting between said valve bore and the atmosphere, said air passage opening toward said valve bore at a position between said second and fourth fluid chambers.

11. A load-compensated type guide mechanism according to claim 7 or 8, wherein said pressure control means further comprises stop means for permitting a predetermined amount of movement of said valve spool.

12. A load-compensated type guide mechanism according to claim 11, wherein said stop means comprises a pair of screw members adjustably threaded in said housing means, one said screw member being disposed adjacent to said one end of said valve spool, while the other said screw member being disposed adjacent to said opposite free end of said valve spool.

* * * * *